E. H. SCHWARTZBURG.
GRAIN SPROUTER.
APPLICATION FILED APR. 24, 1912.
1,039,826.
Patented Oct. 1, 1912.
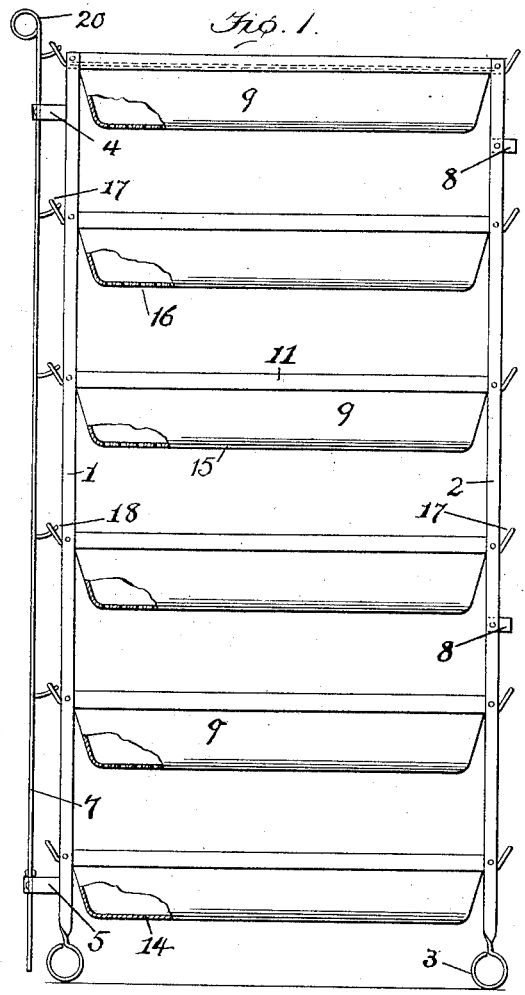
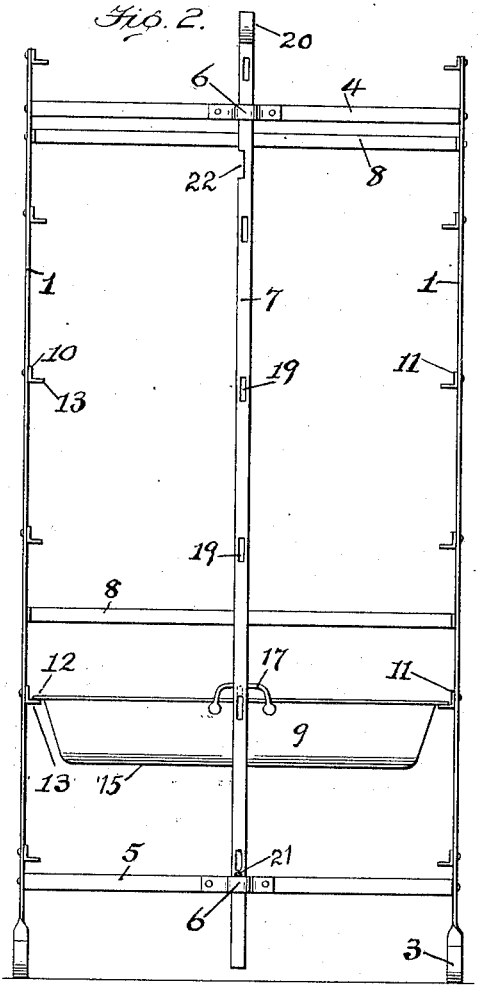
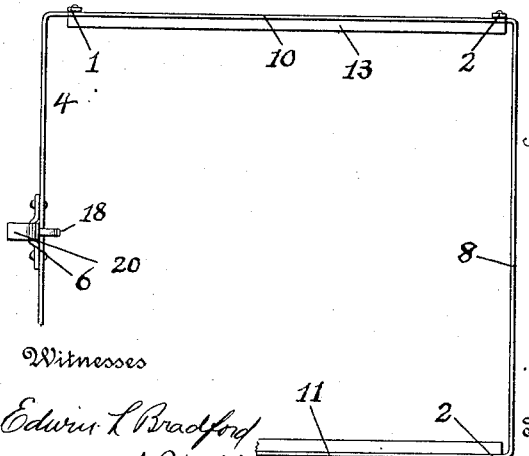
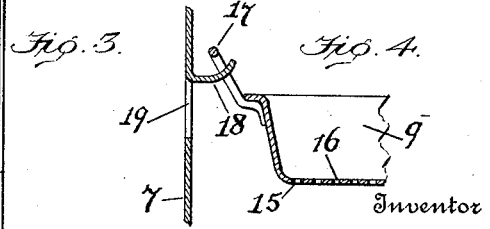
Inventor
Edward H. Schwartzburg
Mann & Co.
Attorneys
Witnesses
Edwin L. Bradford
G. Ferd. Vogt.

UNITED STATES PATENT OFFICE.

EDWARD H. SCHWARTZBURG, OF MILWAUKEE, WISCONSIN, ASSIGNOR TO NATIONAL ENAMELING AND STAMPING COMPANY, A CORPORATION OF NEW JERSEY.

GRAIN-SPROUTER.

1,039,826.  Specification of Letters Patent.  Patented Oct. 1, 1912.

Application filed April 24, 1912. Serial No. 692,914.

*To all whom it may concern:*

Be it known that I, EDWARD H. SCHWARTZBURG, a citizen of the United States, residing at Milwaukee, in the county of Milwaukee and State of Wisconsin, have invented certain new and useful Improvements in Grain-Sprouters, of which the following is a specification.

This invention relates to improvements in grain sprouters or germinators.

The object of the invention is to provide a simple apparatus that in winter may be kept and used in the dwelling house of a farmer or poultry raiser to sprout oats or other grain as green food for chicks and fowls.

The structure of the apparatus is so designed as to admit of convenient management in filling, emptying, and drainage by women or the domestic help of a household.

The invention is illustrated in the accompanying drawing, in which,

Figure 1 is a side elevation of the complete apparatus. Fig. 2 shows a rear elevation being a side that is transverse to that seen in Fig. 1. Fig. 3 is a top or plan view of the supporting rack. Fig. 4 shows a detail in section of part of one sprouting pan, and the vertical bar by means of which any or all the pans may be tilted.

A stationary rack is made of metal and comprises four corner posts, the two rear posts being designated, 1, and the two front posts, 2; each post may have a coiled end, 3, to rest on the floor. The two rear corner posts, 1, of this rack are connected by an upper cross-bar, 4, and a lower cross-bar, 5; each of these two rear cross-bars has a vertical guide or keeper, 6, in which a vertical bar, 7, is free to be moved up or down. The two front corner posts, 2, are also connected by two cross bars, 8, 8.

A series of slideways are provided on which the pans, 9, are supported and may slide so that the pans may slide in and out at the front. The slideway for each pan comprises two angle bars, 10, 11; the angle bars, 10, have horizontal position and are riveted to a rear and a front post at one side of the rack, and the angle bars, 11, are riveted to a rear and front post at the opposite side of the rack. The sprouting pans, 9, are made of sheet metal and have outward-spreading rim-flanges, 12. It will be seen in Fig. 2 that the rim flanges, 12, of the pans rest on the inward-projecting flanges, 13, of the slideways. The lowermost pan differs from all the other pans only in its bottom, 14, which is imperforate and watertight; the bottom, 15, of each of the other pans however has perforations, 16, which allow any excess of water in the moist grain to drip from one pan to the pan next below. This arrangement of perforations in the bottom of all the pans except the lowermost pan, allows the latter to receive the moisture but prevents it from dripping on the floor. Each pan has two loop-shaped handles, 17, that facilitate sliding the pans in and out of the rack, and enable the pans to be lifted.

The vertical bar, 7, has a series of fingers or hooks, 18, all projecting the same way, one for each pan except the bottom pan. In the present instance each finger or hook is made by forming a slot, 19, in the bar and the tongue of metal punched out when forming the slot has one end left attached to the bar, and this tongue projects and forms the finger or hook, 18. At its top end the bar, 7, has a loop, 20, that serves as a handle by grasping which the vertical bar may be raised or lowered by sliding it in the two keepers, 6. The principal function of the fingers or hooks, 18, is that each finger will so engage the rear end of one of the pans, 9, that when the bar, 7, is raised the rear ends of the pans will be tilted up. In the present instance the arrangement is that the said fingers, 18, are in contact with the loop-shaped handle, 17, on the rear end of the pan, but it is obvious this particular arrangement of contacting the fingers, 18, to insure that the rear end of the pans will be tilted up, is unnecessary.

The vertical bar, 7, has a short pin, 21, that extends through the bar with its ends projecting, and when the bar is in its lowered position this pin rests on the lowered cross-bar, 5, and keeper, 6, as seen in Figs. 1 and 2. The vertical bar, 7, is also provided at its side near its top with a notch, 22, see Fig. 2; when this bar has been raised the said notch will have position coincident with the upper keeper, 6, and then the top end of the bar, 7, may be pushed sidewise to cause the notch, 22, to engage with the keeper, 6, and thereby the vertical bar will be retained or kept in its raised position.

When the vertically-movable bar, 7, has the lowered position, each of the several fingers or hooks, 18, on the bar is in position to engage the handle of a pan; this is clearly shown in Figs. 1 and 4. The double result obtained from this particular combination is first that any one of the pans, 9, may be readily drawn outward at the front side of the rack, that is, when a pan is drawn out it will at once disengage from the finger or hook, 18; and second the vertical bar, 7, may be raised, whereupon the rear end of all the pans except the lowermost one will be tilted up, making the rear end higher; this tilting will cause any excess of water or moisture in the pans to drain to the lower end of the pan where such water will pass through the perforations, 16, in the bottom and drip down into the pan below.

It will be seen the supporting rack has no walls; it is made simply of bars and is open at all sides. The pans, 9, are thus supported without being inclosed and the warm air of the house or room has free access to the grain; no special heating device need be used.

Having thus described my invention what I claim and desire to secure by Letters Patent is,—

1. In a grain sprouter the combination of an open-side supporting rack having horizontal bars that form slideways; a series of open top pans that are slidable on said slideways, each pan having loop-shaped handles, and a vertical bar loose on the said rack and movable up and down and provided with a number of fingers which engage the said loop-shaped handles.

2. In a grain sprouter the combination of an open-side supporting rack having a vertical guide or keeper; a vertical bar movable up and down in said keepers and provided with laterally-projecting fingers; a series of sprouting pans slidable horizontally into and out of said supporting rack and one end of each pan engaging a lateral finger on said vertically movable bar.

3. In a grain sprouter the combination of an open-side supporting rack having a vertical guide or keeper; a vertical bar movable up and down in said keepers and having in its side a notch that may engage with one of the keepers when said bar has been moved upward and provided with laterally-projecting fingers; a series of sprouting pans slidable horizontally into and out of said supporting rack and one end of each pan engaging a lateral finger on said vertically movable bar.

In testimony whereof I affix my signature in presence of two witnesses.

EDWARD H. SCHWARTZBURG.

Witnesses:
  MORRIS THOMAS,
  JOHN WEGNER, Jr.

Copies of this patent may be obtained for five cents each, by addressing the "Commissioner of Patents, Washington, D. C."